(12) United States Patent
Alfonsi et al.

(10) Patent No.: US 6,747,207 B2
(45) Date of Patent: Jun. 8, 2004

(54) GAS-TIGHT METAL-CLAD BUSHING

(75) Inventors: Saturnin Alfonsi, Lunel (FR); Pascal Motro, Montpellier (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/365,445

(22) Filed: Feb. 13, 2003

(65) Prior Publication Data
US 2003/0155146 A1 Aug. 21, 2003

(30) Foreign Application Priority Data
Feb. 18, 2002 (FR) .............................. 02 02039

(51) Int. Cl.⁷ ................................. H02G 3/18
(52) U.S. Cl. ................ 174/65 G; 174/135; 174/16.2; 174/21 C; 174/153 G; 174/28; 403/309; 439/604; 248/56; 16/2.1
(58) Field of Search ........................ 174/65 G, 135, 174/16.2, 21 C, 153 G, 28; 403/309; 439/604; 248/56; 16/2.1

(56) References Cited

U.S. PATENT DOCUMENTS

| 3,814,831 A | * | 6/1974 | Olsen ..................... 174/28 |
| 3,819,845 A | * | 6/1974 | Tahiliani ................. 174/11 R |
| 4,090,028 A | | 5/1978 | Vontobel |
| 4,203,280 A | * | 5/1980 | Ziegler et al. ............ 368/187 |
| 4,258,348 A | * | 3/1981 | Belfer et al. ............. 336/73 |
| 4,758,688 A | * | 7/1988 | Aschberger ............ 174/153 G |
| 4,853,670 A | * | 8/1989 | Stengard .................. 338/21 |
| 6,026,521 A | * | 2/2000 | Atkins ................... 4/252.4 |
| 6,150,607 A | * | 11/2000 | Weyl et al. ............. 174/65 G |

FOREIGN PATENT DOCUMENTS

DE 24 18 796 A 10/1975

* cited by examiner

Primary Examiner—Dean A. Reichard
Assistant Examiner—Anton Harris
(74) Attorney, Agent, or Firm—Sughrue Mion, PLLC

(57) ABSTRACT

A bushing for high-voltage and medium-voltage gas-insulated metal-clad electrical switchgear includes a substantially cylindrical metal jacket surrounding a conductive busbar. It also includes a conductive material annular member disposed around the jacket and a cap surrounding the jacket at a distance and adapted to define with the jacket a closed space delimited at one end by the annular member, which is adapted to be sacrificed by being partly melted if an internal arc pierces the jacket and reaches it. This kind of bushing prevents molten metal and hot gases from spraying out following an internal arc.

16 Claims, 1 Drawing Sheet

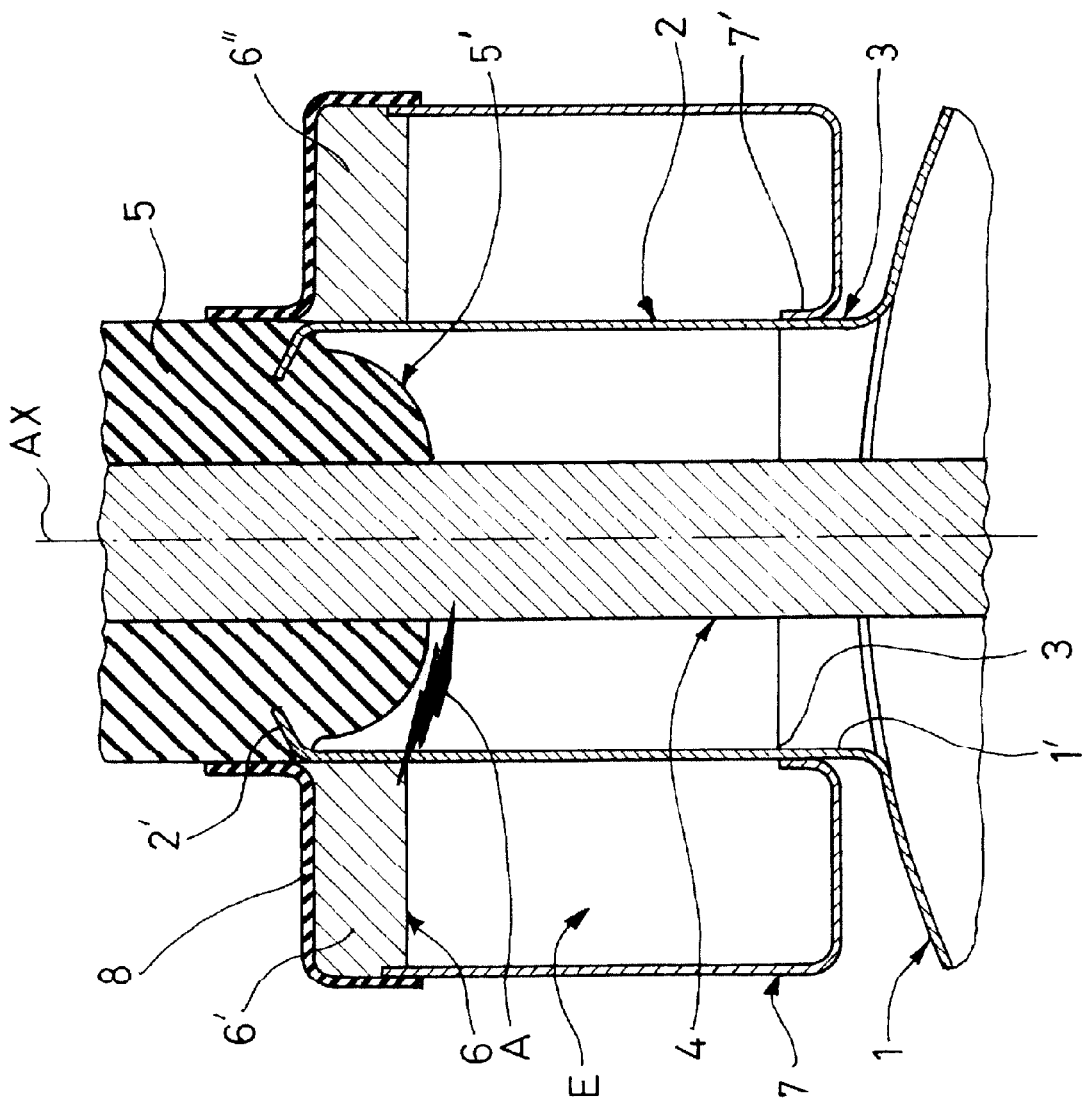

GAS-TIGHT METAL-CLAD BUSHING

BACKGROUND OF THE INVENTION

1. Field of the Invention

The invention relates to a bushing for gas-insulated metal-clad electrical switchgear comprising a substantially cylindrical metal jacket surrounding a conductive busbar.

2. Description of the Prior Art

The invention relates more particularly to a bushing intended to be mounted on the tank of metal-clad high-voltage or medium-voltage switchgear such as a circuit-breaker. The person skilled in the art conventionally refers to the mounting of a bushing on a tank as an "offtake", this term also designating the opening provided in the tank to receive the bushing. This type of tank, usually called a dead tank, is electrically grounded. In the above kind of installation, the bushing can be disposed vertically relative to the tank if the latter is horizontal and is fixed to the ground, but can also be disposed in other directions. The bushing includes a conductive busbar that provides the connection between a conductor outside the jacket and a conductor or electrical switchgear inside the jacket and surrounded by a dielectric gas such as $SF_6$. A portion of the conductive busbar is outside the tank and is electrically isolated from the surrounding air by a sleeve or by a molded electrically insulative material that covers as far as its end a particular length of the busbar, which is conventionally connected to a high-voltage or medium-voltage conductor. This type of bushing generally has a substantially cylindrical metal jacket surrounding the conductive busbar and connected to an opening formed in the tank. The jacket is welded to a flange of the tank, for example, to form with the tank a gas-tight combination containing the insulative gas. The conductive busbar enters the tank via this opening and is electrically connected to a live component of the electrical switchgear. One end of the metal jacket is conventionally fixed to the external perimeter of the lower end of the sleeve. In the following description, the term "sleeve" is used interchangeably to designate an actual removable sleeve or a molded material, in which case removal of the insulative member is not possible.

If an electrical arc is struck between the circuit-breaker tank and the conductive busbar, the electromagnetic forces cause the arc to move along the conductive busbar to the bushing, where it stabilizes between the conductive busbar and the metal jacket and against the end surface of the insulative sleeve that is in contact with the gas contained in the jacket. In the following description, the expression "inside face of the sleeve" refers to this end surface. The arc carries a very high current that can melt the metal jacket. The arc typically perforates the metal jacket and can even cut through it by rotating about the conductive busbar. This phenomenon causes molten metal and hot gases to spray out of the metal jacket. This kind of accident can occur even if a relief valve is provided to evacuate the pressurized hot gases to the exterior of the tank in a controlled direction. This kind of accident can be hazardous to any operators in the vicinity.

To improve the resistance to electrical arcing, the thickness of the metal jacket is conventionally increased, which significantly increases the cost of this kind of bushing, in particular because a stainless metal is generally employed for the jacket.

Another conventional solution to improving resistance to arcing consists of disposing an electrical member at a particular location in the tank of the electrical switchgear, connected to the tank and adapted to be sacrificed by the arc. A reduction of the dielectric distance between a phase and ground at this point favors the striking of the arc at this point in the event of an abnormal overvoltage, the arc stabilizing between this member and a live component of the switchgear, with the result that it eventually melts the member without damaging the tank. However, the electromagnetic forces attracting the arc along the conductive busbar mean that it is not possible to guarantee that the arc will stabilize on the sacrificial member. If the arc is not stabilized on the sacrificial member, or is struck elsewhere than on the sacrificial member, it travels along the bushing and pierces the metal jacket, with the consequences previously mentioned.

The object of the invention is to remedy this drawback by proposing a bushing that is capable of avoiding spraying of molten metal or hot gases out of the bushing in the event of internal arcing.

SUMMARY OF THE INVENTION

To this end, the invention provides a bushing for gas-insulated metal-clad electrical switchgear accommodated inside a tank, including a conductive busbar extending along an axis and surrounded over a portion of its length by an insulative sleeve, and a substantially cylindrical metal jacket which contains the gas and surrounds another portion of the length of the busbar, one end of the jacket being open so that it can be connected and sealed to the tank, and another end of the jacket being closed by the sleeve, which has an inside face constituting its end surface in contact with the gas contained in the jacket, which bushing includes a conductive material annular member surrounding the jacket and situated at substantially the same level as the inside face of the sleeve along the axis of the conductive busbar (4) and includes a cap surrounding the jacket and adapted to form with the jacket a closed space delimited by the annular member at one end.

With the above construction, when the arc travels along the bushing, it is blocked by the inside face of the insulative sleeve and consequently pierces the metal jacket before attaching itself to the annular member. Any molten metal from the annular member sprayed out of the metal jacket is contained within the closed space.

In a preferred embodiment, the annular member comprises two half-flanges which are screwed together so that they can be clamped onto the metal jacket and the cap is circular and is fixed by force fitting it, which reduces the cost of fabrication of the bushing.

In another preferred embodiment, the outside surface of the annular member is entirely covered with an insulative material sheath to prevent any molten metal from spraying out in the event of very high current electrical arcing.

The invention is described in more detail hereinafter with reference to the accompanying drawing, which shows one embodiment of the invention by way of nonlimiting example.

BRIEF DESCRIPTION OF THE DRAWING

The single FIGURE is a representation in section of a bushing according to the invention.

DETAILED DESCRIPTION OF THE PREFERRED EMBODIMENT

The tank of high-voltage or medium-voltage electrical switchgear such as a circuit-breaker generally includes substantially cylindrical offtakes for connecting bushings. Each metal jacket of a bushing is extended by a flange formed in the tank at the level of what is referred to in this description as an offtake.

In the example shown in the single FIGURE, a bushing according to the invention is installed in substantially vertical alignment with an offtake formed on the upper portion of the tank 1, the tank being fixed to the ground. The flange 1' is formed when the tank 1 is extruded, for example, and its diameter is substantially equal to that of the metal jacket 2 of the bushing so that it can be butt-jointed to one end of the jacket by a weld 3. The jacket 2 surrounds a conductive busbar 4 that penetrates to the interior of the tank 1 where it is electrically connected to a member of the switchgear. The busbar 4 extends along the axis AX to connect the switchgear to other conductive busbars or electrical cables external to the tank. At the end of the jacket opposite the offtake, the busbar is surrounded by an electrically insulative material sleeve 5 to which the metal jacket 2 is connected to seal the tank. In the example shown, the sleeve 5 has an outside diameter substantially equal to the diameter of the metal jacket and its inside face 5' is convex.

In accordance with the invention, the metal jacket 2 is surrounded by an annular conductive material member 6 at substantially the same level as the inside face 5' of the insulative sleeve along the axis AX. If an internal electrical arc A is struck inside the tank 1, the electromagnetic forces throw the arc that has been struck between the conductive busbar 4 and the metal jacket 2 against the face 5' of the insulative sleeve, which melts the jacket. The arc A then necessarily reaches the annular member 6, where it stabilizes. To be more specific, as the duration of the arc is limited by the systems for protecting the upstream electrical network from short circuits, the annular member 6 is designed to be sacrificed but is sufficiently massive not to be entirely melted by the arc A during this period.

Furthermore, the metal jacket is surrounded at a distance by a cap 7 adapted to form with it a closed space E delimited by the annular member 6 at one end. If molten metal produced by the melting of the annular member or the jacket by the arc A is sprayed, the molten metal and the hot gases are retained inside the closed space E by the cap 7, with the result that there is no external manifestation of the internal arc. The annular member 6 is made from a conductive material, and consists of a steel casting or a pressed steel component, for example. In the example shown in the single FIGURE, the annular member 6 has a substantially rectangular section. It has an inside diameter substantially equal to the outside diameter of the metal jacket 2 that it surrounds, and is disposed at substantially the same level as the inside face of the insulative sleeve along the axis of the busbar.

The annular member 6 therefore surrounds the end of the jacket opposite the offtake and can be mounted on the metal jacket in various ways, provided that it is rigidly fixed to it or held firmly. This member can advantageously comprise two half-flanges 6' and 6" which are screwed together. During assembly, the half-flanges 6' and 6" can be positioned around the metal jacket 2 first, before tightening the screws. In this embodiment, the mounting of the annular member is simplified to reduce the cost of the bushing.

The annular member can also be held in position around the jacket 2 of the bushing by conventional fixing means, or by the cap 7, so that it remains in position if an electrical arc melts it. As shown in the FIGURE, the member 6 can be fixed to the metal jacket in direct contact therewith. The jacket 2 is advantageously fixed to the end of the insulative sleeve 5 so that there is no risk of the annular member 6 moving or separating if the metal jacket 2 is melted all around its circumference by the arc A. To be more specific, if the arc A rotates and melts a particular height of the metal jacket 2 around the whole of its circumference, whilst also melting over the whole of its diameter a portion of the conductive busbar 4, the annular member 6 continues to be secured around the end of the sleeve by the remaining metal jacket 2.

If the sleeve is molded, it is advantageous for the metal jacket 2 to be fixed to the end of the sleeve by the molded material, enabling the edge 2' at the end of the jacket to be enveloped in the injected resin. As shown in the single FIGURE, the edge 2' at the end has a diameter that is small compared to the jacket in order to control the electrostatic field within the insulation 5. With this arrangement, the other end of the jacket 2 can be fixed to the flange 1' of the tank 1 by a weld at the level 3.

The cap 7 which defines a closed space E with the annular member 6 and the metal jacket 2 can be made from shaped sheet metal, for example. The cap 7 is circular, for example, defining a cylinder having a diameter close to the outside diameter of the annular member. The cap advantageously has a substantially flat bottom normal to its axis of revolution, which is the axis AX, and therefore has a longitudinal half-section that is approximately L-shaped. As can be seen in the single FIGURE, the central orifice of the cap 7 has a diameter close to the outside diameter of the jacket 2 and incorporates a cylindrical rim 7' adapted to surround the jacket. To simplify the assembly of the bushing, in order to reduce its cost, the cap can advantageously be mounted by force fitting its cylindrical rim to the jacket.

As shown in the single FIGURE, the annular member 6 has a shoulder in its peripheral portion that defines the outside diameter of the member. The annular member can therefore be nested in the end of the cylindrical portion of the cap 7 to abut it against the shoulder. The closed space E is then delimited by the annular member 6 in the axial direction away from the offtake.

The whole of the outside surface of the annular member 6, including its plane outside surface perpendicular to the busbar, is preferably covered by an arc-resistant insulative material sheath 8. If the member 6 is melted over the whole of its height by an arc, or if the member is merely perforated by the arc, the sheath 8 prevents molten metal from spraying out of the bushing. On the other hand, the sheath 8 also isolates the closed space from the air outside the bushing, even if the member 6 takes the form of two half-flanges. It is advantageously extended in the axial direction AX on both sides of the member 6, so as also to surround a portion of the cap 7 and a portion of the insulative sleeve 5.

The sheath 8 can be made from various materials having satisfactory heat resistance, so as to resist any arcing at the level of the bushing to prevent any perforation. The sheath and the sleeve or molding 5 are advantageously made of EPDM or silicone. These materials have an elasticity that is beneficial from the point of view of correct clamping of the sheath to the annular member. The sheath can be installed by sliding it along the insulative sleeve 5 to cover the annular member 6 and the end of the cap 7.

As previously mentioned, a bushing according to the invention is not necessarily disposed along a vertical axis, but can have its axis AX in any other direction. Furthermore, the external conductors connected to the switchgear contained in the metal-clad tank can be situated under the tank, as is often the case with indoor metal-clad equipment, for example. The offtakes for the bushings are then formed in the lower part of the tank.

Furthermore, the closed space E can accommodate measuring instruments. In particular, one or more current transformers can be installed around the metal jacket 2 inside this space.

What is claimed is:

1. A bushing for gas-insulated metal-clad electrical switchgear accommodated inside a tank, including a conductive busbar extending along an axis and surrounded over a portion of its length by an insulative sleeve, and a substantially cylindrical metal jacket which contains said gas and surrounds another portion of the length of said busbar, one end of said jacket being open so that it can be connected and sealed to said tank, and another end of said jacket being closed by said sleeve, which has an inside face constituting its end surface in contact with said gas contained in said jacket, which bushing includes a conductive material annular member surrounding said jacket and situated at substantially the same level as said inside face of said sleeve along said axis of said conductive busbar and includes a cap surrounding said jacket and adapted to form with said jacket a closed space delimited by said annular member at one end.

2. The bushing claimed in claim 1, wherein said annular member comprises two half-flanges which are screwed together, said half-flanges being clamped around the end portion of said metal jacket closed by said sleeve.

3. The bushing claimed in claim 1, wherein said cap has a circular shape concentric with the axis of said busbar and is force fitted to said metal jacket or to a flange of said tank connected to said jacket.

4. The bushing claimed in claim 1, wherein the annular member is adapted to nest inside the end of said cylindrical portion of said cap and includes a shoulder forming a nesting abutment.

5. The bushing claimed in claim 1, including an insulative material sheath entirely covering the outside surface of said annular member.

6. The bushing claimed in claim 5, wherein said insulative material is EPDM or silicone.

7. The bushing claimed in claim 1, wherein one or more current transformers are installed around said metal jacket inside said closed space.

8. A gas-insulated metal-clad electrical switchgear including a bushing as claimed in claim 1 mounted on an offtake from said tank of said switchgear.

9. A bushing for gas-insulated metal-clad electrical switchgear accommodated inside a tank, including a conductive busbar extending along an axis and surrounded over a portion of its length by an insulative sleeve, and a substantially cylindrical metal jacket which contains said gas and surrounds another portion of the length of said busbar, one end of said jacket being open so that it can be connected and sealed to said tank, and another end of said jacket being closed by said sleeve, which has an inside face constituting its end surface in contact with said gas contained in said jacket, which bushing includes sacrificial means for being partially melted if reached by an internal arc, said sacrificial means surrounding said jacket and situated at substantially the same level as said inside face of said sleeve along said axis of said conductive busbar and including cap means for containing molten metal and hot gas caused by said sacrificial means being partially melted by an internal arc, said cap means surrounding said jacket and adapted to form with said jacket a closed space delimited by said sacrificial means at one end.

10. The bushing claimed in claim 9, wherein said sacrificial means comprises two half-flanges which are screwed together, said half-flanges being clamped around the end portion of said metal jacket closed by said sleeve.

11. The bushing claimed in claim 9, wherein said cap means has a circular shape concentric with the axis of said busbar and is force fitted to said metal jacket or to a flange of said tank connected to said jacket.

12. The bushing claimed in claim 9, wherein the sacrificial means is adapted to nest inside the end of said cylindrical portion of said cap means and includes a shoulder forming a nesting abutment.

13. The bushing claimed in claim 9, including an insulative material sheath entirely covering the outside surface of said sacrificial means.

14. The bushing claimed in claim 13, wherein said insulative material is EPDM or silicone.

15. The bushing claimed in claim 9, wherein one or more current transformers are installed around said metal jacket inside said closed space.

16. A gas-insulated metal-clad electrical switchgear including a bushing as claimed in claim 9 mounted on an offtake from said tank of said switchgear.

* * * * *